United States Patent
Rodriguez

(10) Patent No.: US 7,943,050 B2
(45) Date of Patent: May 17, 2011

(54) METHOD FOR CONTROLLING MICROBIAL CONTAMINATION IN WATER

(75) Inventor: Felix Rodriguez, Webster, TX (US)

(73) Assignee: Aquamaker LLC, Houston, TX (US)

(*) Notice: Subject to any disclaimer, the term of this patent is extended or adjusted under 35 U.S.C. 154(b) by 0 days.

(21) Appl. No.: 12/762,326

(22) Filed: Apr. 17, 2010

(65) Prior Publication Data

US 2010/0252504 A1 Oct. 7, 2010

Related U.S. Application Data

(60) Division of application No. 11/772,647, filed on Jul. 2, 2007, now Pat. No. 7,723,253, which is a continuation-in-part of application No. 10/684,185, filed on Oct. 12, 2003, now abandoned.

(51) Int. Cl.
*C02F 1/50* (2006.01)

(52) U.S. Cl. .................................. 210/764; 422/28

(58) Field of Classification Search .............. 20/501, 20/502.1, 660, 670, 673, 687, 764; 422/28; 424/641; 423/712; 502/60, 85, 407, 414
See application file for complete search history.

(56) References Cited

U.S. PATENT DOCUMENTS 4,938,958 A * 7/1990 Niira et al. ............... 424/78.1
5,011,602 A * 4/1991 Totani et al. .............. 210/484

FOREIGN PATENT DOCUMENTS

WO    WO 99/33335 A2 *   8/1999

\* cited by examiner

*Primary Examiner* — Matthew O Savage
(74) *Attorney, Agent, or Firm* — Robert F. Gilbert

(57) ABSTRACT

A method for controlling the microbial contamination of water. Impure water is passed through a container packed with a specially-treated antimicrobial zeolite material. Zinc ions incorporated into the framework of the zeolite provide the antimicrobial effect. The method is designed to control bacterial levels while preserving the taste and potability of the water.

10 Claims, 2 Drawing Sheets

METHOD FOR CONTROLLING MICROBIAL CONTAMINATION IN WATER

CROSS-REFERENCE TO RELATED APPLICATIONS

This application is a division of application Ser. No. 11/772,647, filed on Jul. 2, 2007, now U.S. Pat. No. 7,723,253 which is a continuation-in-part of application Ser. No. 10/684,185, filed on Oct. 12, 2003, now abandoned, which applications are incorporated by reference.

BACKGROUND OF THE INVENTION

1. Field of the Invention

The present invention relates to methods for treating water so as to control microbial contamination and to provide water that is both safe to drink as well as free of unpleasant tastes and odors.

2. Background and Prior Art

Methods of producing high quality drinking water in a portable unit by condensation of dew from ambient air are well known in the art. For example, U.S. Pat. No. 5,669,221 issued to LeBleu et al on Sep. 23, 1997, and U.S. Pat. No. 5,845,504 issued to LeBleu on Dec. 8, 1998, teach a portable non-attended potable water generator enclosed in a decorative case. U.S. Pat. No. 5,553,459 issued to Harrison on Sep. 10, 1996, similarly teaches a water-making apparatus which produces potable water from moisture in the air.

Without satisfactory disinfection of drinking water, numerous problems can result. For example, the typhoid and cholera epidemics which were common throughout American cities in the last century were caused by poor disinfection. The Environmental Protection Agency's Science Advisory Board concluded in 1990 that exposure to microbial contaminants such as bacteria, viruses, and protozoa (e.g., *Giardia lamblia* and *Cryptosporidium*) was likely the greatest remaining health risk management challenge for drinking water suppliers.

It has also been recently learned that there are specific microbial pathogens, such as *Cryptosporidium*, that are highly resistant to traditional disinfection practices. In 1993, *Cryptosporidium* caused 400,000 people in Milwaukee to experience intestinal illness. More than 4,000 were hospitalized, and at least fifty deaths have been attributed to the disease. There have also been cryptosporidiosis outbreaks in Nevada, Oregon, and Georgia over the past several years. Because of these problems, disinfection has long been recognized as an essential part of the art of producing drinking water. One of the more troubling problems with producing high-quality drinking water from condensation, yet one of the most important, concerns the control of microbial contamination.

There are currently two main commercial ways of treating microbial contamination in drinking water: chlorine and ultraviolet light.

Chlorine is the standard form of treatment used in municipal water treatment systems. However, chlorine is a toxic substance and must be used under strict controls which would be difficult to implement in a portable, unattended device. Chlorine also imparts an unpleasant taste to water, and can react with naturally-occurring materials in the water to form unintended organic and inorganic byproducts which may pose health risks. Oxidizing agents stronger than chlorine—such as ozone or iodine—can also be used, but these are also difficult to implement, may impart unpleasant taste, and can cause the formation of halogenated organic compounds.

Ultraviolet (UV) lights have become the main treatment method for rural residential and commercial systems, and the previously-referenced patents to LeBleu and Harrison teach the control of microbial contamination in water collected from condensation by employing a bacteriostatic loop employing UV light. UV light has a number of practical difficulties, however, such as the difficulty of determining the correct size of the UV light and problems associated with contamination. Levels of water hardness, iron, manganese, humic and fumic acid, tannins and other materials must be minimal to avoid staining on the lamp's internal sleeve which can shield bacteria from the UV rays. Most importantly, UV light has been found to be ineffective for use with water produced from condensation. Although the reason is not precisely known, it is perhaps because the pathogens involved are dissimilar from those found in natural water where UV light has been found to be more effective.

In addition to the methods of disinfection which rely on chlorine or UV light, a number of other methods of disinfection have been proposed. The use of filtration has been proposed, as discussed in U.S. Pat. No. 3,242,073, although this would not be practical in an unattended device.

The use of electrical water purification using an ionization chamber or chambers and electrodes of various alloys, including silver and copper, has been proposed to control algae and bacteria. Prior patents dealing with the problem of electrical water purification include U.S. Pat. No. 4,525,253 issued to Hayes et al on Jun. 25, 1985. The '253 patent teaches the use of electrodes of a copper/silver/nickel alloy. The reference, which is contemplated mainly for swimming pools and other outdoor water storage areas, is directed to removal of algae and bacteria without the use of chlorine; however, the presence of silver in drinking water may lead to health problems. As does the '253 patent, U.S. Pat. No. 4,680,114 issued to Hayes on Jul. 14, 1987, and U.S. Pat. No. 6,207,060 issued to McKay on Mar. 27, 2001 teach the use of silver and copper/silver alloyed electrodes, or copper or zinc electrodes. U.S. Pat. Nos. 4,263,114 & 4,328,084 issued to Shindell disclose the use of electrodes to destroy organic matter, especially in swimming pools and spas. However, the addition of excess sodium to drinking water may be detrimental to human health.

Treatment of household drinking water by passing the water through a bed of activated charcoal impregnated with or having oligodynamic silver or other bactericide adsorbed thereon is known from the prior art. For example, U.S. Pat. No. 2,595,290, patented May 6, 1952, U.S. Pat. No. 3,242,073 patented Mar. 22, 1966, U.S. Pat. No. 3,268,444, patented Aug. 27, 1968, U.S. Pat. No. 3,585,130, patented Jun. 15, 1971, and the references cited therein. In addition, the National Aeronautics and Space Administration has conducted experiments and constructed apparatus for treating spacecraft water using silver ions for biocidal and virucidal purposes. Reference to this work is cited in U.S. Pat. No. 4,198,296, and teaches the biocidal and virucidal effects of silver ions in a very pure distilled or deionized water.

There is a need for a simple, inexpensive method and composition for reducing microbial contamination of water, including water produced from condensation. Such should preserve the taste and quality of the water while being inexpensive and capable of simple, unattended operation.

SUMMARY OF THE INVENTION

It is an object of the present invention to provide a method and composition which simply and inexpensively reduces the microbial contamination of water while preserving the taste and quality of the water. The apparatus produces biologically safe and palatable drinking water by contacting the water with a biocide in an apparatus designed to reduce contamination to acceptable levels. The biocide is a disinfectant composition made from a zeolite which is subjected to low and high pH and slow drying process in which a comparatively large amount of antibacterial metal or metal salt is retained by adsorption. The process yields a material capable of controlled release of zinc ions into the water.

BRIEF DESCRIPTION OF THE DRAWINGS

While the specification concludes with claims particularly pointing out and distinctly claiming the invention, it is believed that the present invention will be better understood from the following description taken in conjunction with the accompanying drawing in which:

DETAILED DESCRIPTION

While this invention may be embodied in many different forms, there are described in detail herein specific preferred embodiments of the invention. The descriptions are an exemplification of the principles of the invention and are not intended to limit the scope of the invention to the particular embodiments illustrated.

Figure 1:
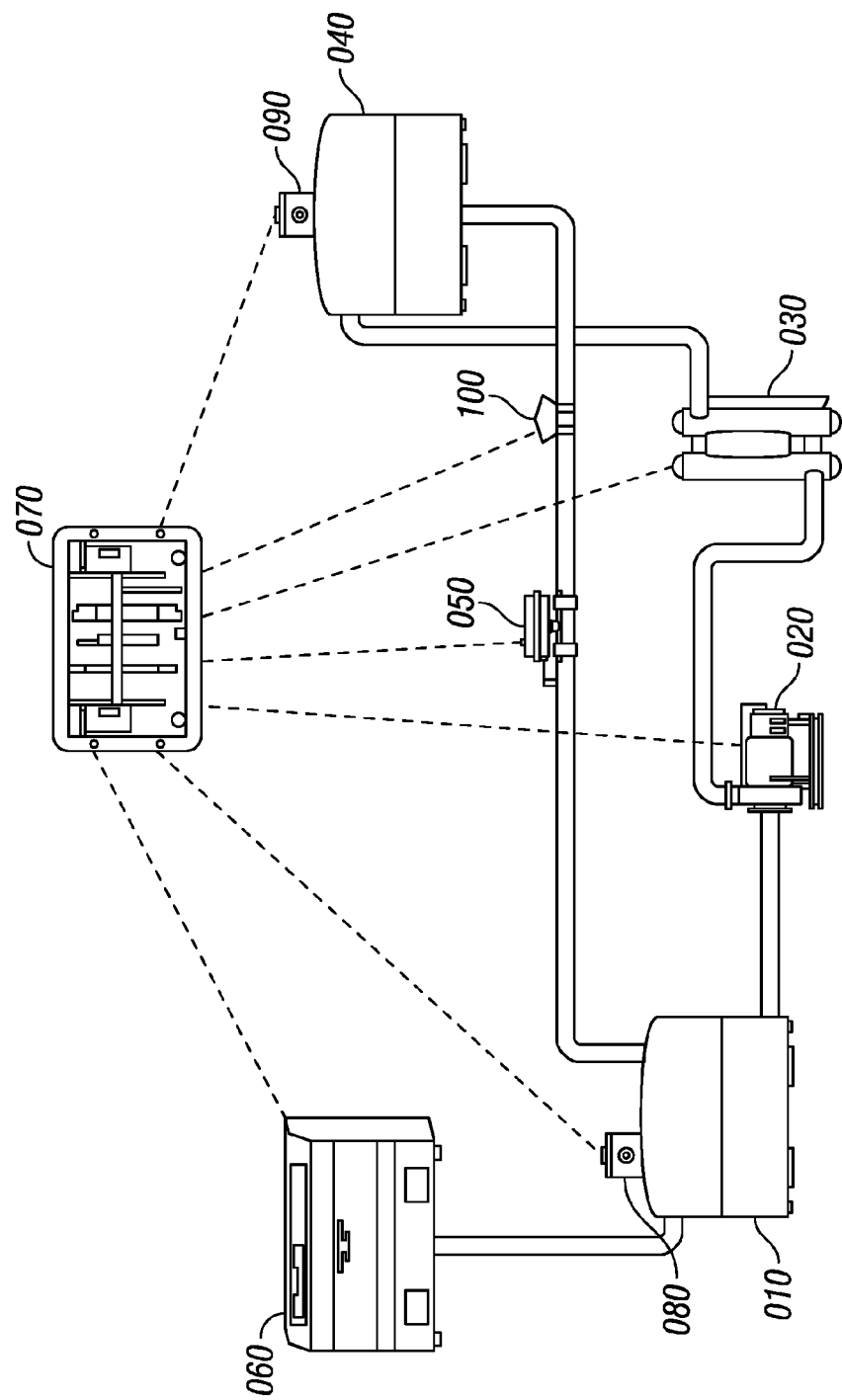
FIG. 1 is a diagrammatic view illustrating the flow process of an apparatus in accordance with the teaching of the invention.

With reference to the drawings, FIG. 1 illustrates a general schematic illustration of one embodiment of the instant invention consisting of a closed loop water treating system which includes a dehumidifier 060 which produces water from condensation of air which is collected in a bottom tank 010. When the bottom tank 010 is full, the magnetic level control 080 will send a signal to the microprocessor 070 which in turn will send a signal to activate the pump 020. From the bottom tank 010 the water is pumped thru the biocide 030 and then the water is delivered to the top holding tank 040. A level control 090 will detect when the tank 040 is full, whereupon the level control 090 will send a signal to the microprocessor 070 to stop the pump 020. The microprocessor 070 sends a signal every six hours to the recycling valve 050 to recycle the water from the top holding tank 040 to the bottom tank 010 to prevent growth of bacteria in the water. The conductivity sensor 100 may be any commercially available device well known in the art which measures the conductivity of the water such that if the quality of the water changes, the output of the conductivity sensor 100 will change, and the microprocessor 070 will detect the change in the conductivity sensor 100 and will stop the pump 020 and send an alarm signifying that the quality of the water may not be safe for consumption.

Description of the Biocide

In a preferred embodiment of the present invention the biocide consists of a zeolite which is specially treated to inhibit biological activity, as described below.

The zeolite can be any zeolite selected from among those which are well known in the art. In a preferred embodiment the zeolite is clinoptilolite, a naturally occurring volcanic mineral, which is a hydrated aluminosilicate with infinite three-dimensional frameworks of silicon-oxygen ($SiO_4$) tetrahedra. The material is available from Bompahi Mexico City mined at a deposit in Coahuila, Mexico. The zeolite contained in the mineral is a clinoplilolite-heulandite, hydrated aluminum silicate which chemical composition is $(Na_{1.84}K_{1.76}Mg_{0.2}Ca_{1.24})(Si_{29.84}Al_{6.16}O_{72}{}^+)$ $21.36H_2O$ Mineralogical composition: Ca—K—Na-hydrated aluminosilicate Mineralogical analysis (XRD): Clinoptilolite min. 75% (Calcium-Potassium-Sodium type, $Si/Al_{5.4}$) with minor feldspar (5%) and montmorillonite (4%).

Pore volume: 0.34 $cm^3/cm^3$

Physical properties (typical): Specific density 1.4-1.6 $g/cm^3$, Bulk density 0.6-0.8 $g/cm^3$, Mohs hardness 3.5-4, Alkali stability 7-11 pH, Acid stability 7 pH, Moisture content 7%+2%, Absorbing gases $NH_3$, $H_2S$; Color: Greenish, Gray.

Preparation and Activation

Screening

In a preferred embodiment, the zeolite is first screened to produce a desired particle size. In one embodiment, particle sizes of less than 0.091 mm are selected. In another embodiment, particle sizes of between 1 and 3 mm are selected. In yet another embodiment, particle sizes of 3 to 10 mm are selected.

Purification

In one embodiment, following screening, the zeolite was purified by washing with high-quality hydrochloric acid for the regeneration of ion exchange and to remove $Na^+$ and $Ca^{2+}$. A solution was prepared by diluting 125 ml of 30% HCl in 8 liters of distilled water at a room temperature. The solution was added to 320 oz. of zeolite, creating a slurry. This slurry was placed inside an oven at approximately 90 to 200° C. for drying.

Activation

In a preferred embodiment, the zeolite was activated by a solution prepared by diluting 2 ml sulfuric acid in 2 liters of water, lowering the pH to about 1-4, then adding to the solution 6 oz. of $ZnSO_4.7H_2O$ (zinc sulfate). Zinc chloride and zinc oxide can also be used. This solution was added to 320 oz. of zeolite, mixed for 10 minutes, and placed in a drying oven at a temperature of approximately 90 to 150° C. for 4 hours or 2-15 hours until the zeolite was complete dry. After the zeolite was dry, a solution of 20 ml sodium hydroxide in 2 liters of distilled water at pH of 11 was added to the 320 oz of zeolite, mixed for 10 minutes, placed in the oven at a temperature of approximately 90 to 150° C. for 4 hours or until the zeolite was completely dry. This modification imparts zinc ions into the structure of the zeolite. In one embodiment, the previously described clinoptilolite was treated for a period sufficient to incorporate sufficient zinc into the clinoptilolite. The actual concentration of $ZnSO_4.7H_2O$ is selected from within the range of 1 to 10% by weight of $ZnSO_4.7H_2O$ so as to be sufficient to impart the desired biological activity. An object of the present invention is to provide an antibacterial zeolite material in which an antibacterial metal or metal ion will not elute into any contacting medium whatsoever, as a result of which the material exhibits superior antibacterial property safely and for an indefinite period of time.

Ion Exchange Properties

A chemical analysis showed that zinc in the clinoptilolite will exchange with calcium $Ca^{2+}$ even though the selectivity of this zeolite is lower for zinc ions. However, lowering the pH to 1-3 at first step and increasing the pH to 9-11 at the end at the conditions established for the exchange reaction increased the adsorption of the metal zinc into the clinoptilolite structure.

The release of zinc from the biocide was studied in two different systems: 1) a drinking water system, and 2) a NaCl (0.9%) dissolution (pH 5.8) to approach a simple biological media.

Figure 2:
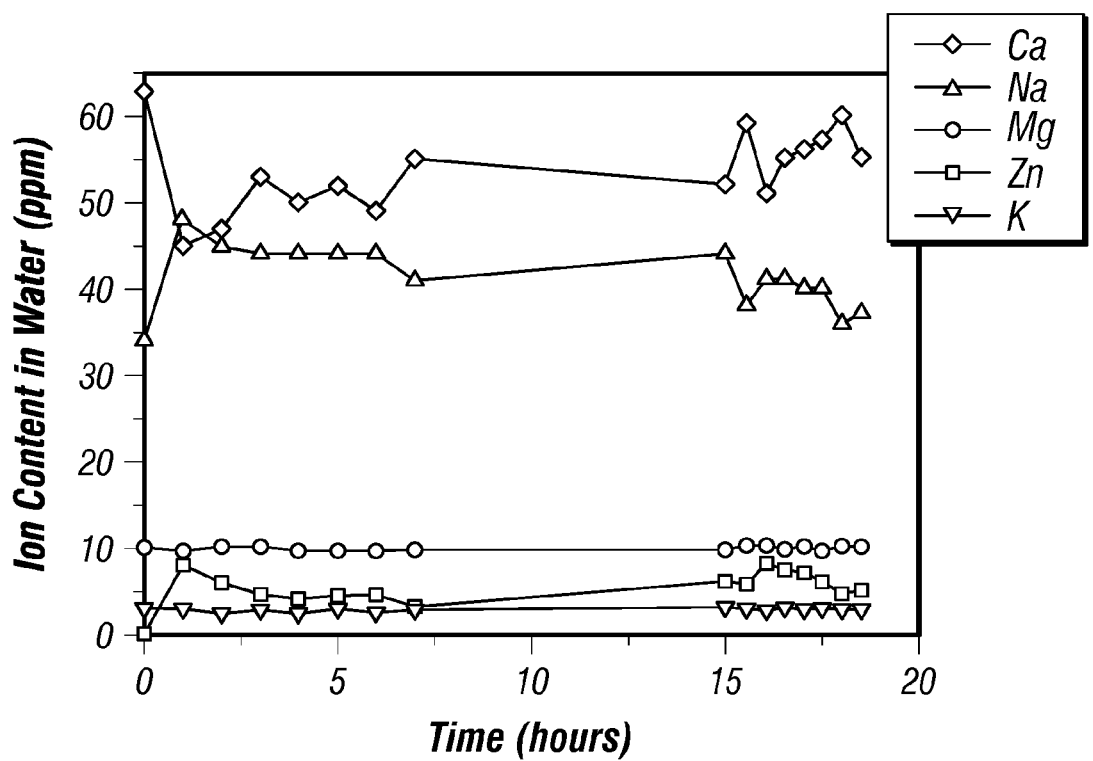
FIG. 2 shows the performance of the ion exchange process.

FIG. 2 shows the measured performance of the different cations in the exchange process of the biocide when the biocide was placed in a column containing a 20 cm-long bed of biocide, with diameter of 2 cm, and drinking water was passed through. The ion exchange study showed that $Zn^{2+}$ ions are mainly exchanged from the biocide by $Ca^{2+}$, and in lower proportion by $Na^+$, ions present in water. The amount of zinc released from the clinoptilolite structure to the drinking water was lower than 10 ppm, which meets the typical requirement for drinking water. This zinc content suffices to produce a bactericidal effect.

An exchange study using a NaCl dissolution demonstrated that it is the clinoptilolite that controls the release of $Zn^{2+}$ ions from the biocide. FIG. 2 shows the plot of zinc content in the NaCl dissolution vs. exchange time after the contact between the biocide and NaCl dissolution and the velocity of $Zn^{2+}$ ions release from the biocide. The plotting was adjusted to the Higuchi model, confirming the controlled released of $Zn^{2+}$ ions by the zeolitic material.

Biological Properties

A study was conducted using the biocide of the instant invention. Table 1 shows the results of a microbiological test conducted using drinking water—without chlorine—contaminated with *Escherichia coli* ATCC 25922. Notice how the number of colony unit formation was reduced within the first 2 to 5 hours of contact with the biocide and without stifling the system. A comparison of the biocide and chlorination treatments showed that the biocide is equally effective for the elimination of microbiological contamination.

TABLE 1

Bactericidal effect of biocide of instant invention against
*Escherichia coli* ATCC 25922 in drinking water

| | COLONY UNIT FORMATION | | |
|---|---|---|---|
| Time [hours] | Biocide [0%] | Biocide [5%] | Biocide [10%] |
| 0 | $81 \times 10^3$ | 100 | 50 |
| 2 | $10 \times 10^3$ | 80 | 50 |
| 5 | $29 \times 10^3$ | 10 | 5 |
| 24 | $71 \times 10^3$ | 80 | 10 |
| 48 | $92 \times 10^3$ | $89 \times 10^2$ | $3 \times 10^2$ |

CONCLUSIONS

The results obtained in all the studies lead to the conclusion that the instant invention provides a controlled release of zinc ions to the biological media and water, and has the desired disinfectant result. A chemical analysis of the activated clinoptilolite indicates that zinc exchanges with the naturally occurring calcium even though the selectivity is lower for the zinc ions.

EXPERIMENTAL ANALYSIS

An evaluation of the invention was performed to test its effectiveness and efficiency by installation on a commercially available unit, a Model No. LA1 available from Liquid Air, 249 E. Ocean Blvd., Ste. 1010, Long Beach, Calif. 90802. The tested unit consists of a portable, potable-water generator for producing high-purity liquid water by condensation of dew from ambient air. An enclosed heat absorber cools the filtered air below its dew point and collects droplets of condensate into a closed system. The collected liquid dew is further treated in a bacteriostatic loop consisting of a UV light to destroy living organisms followed by a carbon filter and 1 micron filter. The water is recycled through the bacteriostatic loop every 3 hours.

Example 1

The test unit equipped with the standard UV light system followed by a carbon filter and 1 micron filter was placed in an environment simulating that of a typical home and observed for a period of time, with the following results.

Mar. 27, 2003: Unit placed in service.
Apr. 16, 2003: Water tanks observed to be contaminated with slime and algae. Unit replaced.
May 21, 2003: Water tanks again contaminated with slime and algae. Unit replaced.
Jun. 23, 2003: Water tanks again contaminated with slime and algae. Unit replaced.
Jun. 30, 2003: Test unit was modified to include the present invention in place of the UV light, carbon filter and 1 micron filter, (the UV light, carbon filter, and 1 micron filter were removed) and the system was placed in service in the same environment, with the following results:

No slime or algae was observed and the following measurements were obtained:

| DATE | HETEROTROPHIC PLATE COUNT |
|---|---|
| Jul. 3, 2003 | NA |
| Jul. 7, 2003 | NA |
| Jul. 8, 2003 | NA |
| Aug. 4, 2003 | NA |
| Aug. 5, 2003 | 2 |
| Aug. 11, 2003 | 5 |
| Aug. 25, 2003 | 7 |
| Sep. 15, 2003 | 1 |

Example 2

A test unit similar to that described in Example 1 equipped with the standard UV light, carbon filter and 1 micron filter was placed in a typical office environment (temperature 74 to 78° F., humidity 44 to 56%). The unit was placed in service on Jun. 28, 2003 with the following results:

| DATE | HETEROTROPHIC PLATE COUNT |
|---|---|
| Jul. 3, 2003 | 108000 |
| Jul. 8, 2003 | 32000 |
| Jul. 8, 2003 | 35680 |

The test unit was modified to include the present invention in place of the UV light system, carbon filter, and 1 micron filter, and the unit was returned to the same typical office environment (temperature 74 to 78° F., humidity 44 to 56%, with the following results:

| DATE | HETEROTROPHIC PLATE COUNT |
|---|---|
| Aug. 4, 2003 | 46 |
| Aug. 5, 2003 | NA |
| Aug. 11, 2003 | 25 |

| DATE | HETEROTROPHIC PLATE COUNT |
|---|---|
| Aug. 25, 2003 | NA |
| Sep. 15, 2003 | NA |

While particular embodiments of the subject invention have been described, it will be obvious to those skilled in the art that various changes and modifications of the subject invention can be made without departing from the spirit and scope of the invention. It will be clear to those skilled in the art that various changes and modifications may be made without departing from the scope of the invention and the invention is not to be considered limited to the embodiments and examples that are described in the specification.

What is claimed is:

1. A method for controlling the microbial contamination of water comprising:
 a) sizing clinoptilolite to a range of particle diameters from about 1 mm to about 10 mm;
 b) washing the clinoptilolite from step a) with a hydrochloric acid solution to remove sodium and calcium ions;
 c) drying the clinoptilolite from step b);
 d) mixing the clinoptilolite from step c) with a solution having a pH of about 1-4 containing sulfuric acid and a zinc compound;
 e) drying the clinoptilolite from step d);
 f) adding a solution having a pH of about 9-11 containing sodium hydroxide to the clinoptilolite from step e);
 g) drying the clinoptilolite from step f);
 h) placing the clinophilolite from step g) into a container; and
 i) passing the water through the container from step h) to control the microbial contamination of the water.

2. The method of claim 1, wherein the hydrochloric acid solution in step a) includes 125 ml of 30% hydrochloric acid and 8 L of distilled water.

3. The method of claim 1, wherein the solution in step d) is made by diluting about 2 ml sulfuric acid in about 2 liters of water.

4. The method of claim 1, wherein step e) includes drying the clinoptilolite from step d) in an oven at a temperature of approximately 90 to 150° C.

5. The method of claim 4, wherein the step of drying in an oven lasts approximately two to fifteen hours.

6. The method of claim 1, wherein the zinc compound of step d) is selected from the group consisting of zinc sulfate, zinc chloride, and zinc oxide.

7. The method of claim 1, wherein the pH of the solution in step d) is approximately 1 to 3.

8. The method of claim 1, wherein the zinc compound used in step d) is $ZnSO_4 \cdot 7H_2O$.

9. The method of claim 8, wherein a concentration of $ZnSO_4 \cdot 7H_2O$ in the solution of step d) is in the range of 1 to 10 percent by weight.

10. The method of claim 1, wherein the solution in step f) is made by diluting about 20 ml sodium hydroxide in about 2 liters of water, and step g includes drying in a oven at a temperature of approximately 90 to 150° C.

* * * * *